US010200192B2

(12) United States Patent
Buch

(10) Patent No.: US 10,200,192 B2
(45) Date of Patent: Feb. 5, 2019

(54) SECURE EXECUTION ENVIRONMENT CLOCK FREQUENCY HOPPING

(71) Applicant: Seagate Technology, LLC, Cupertino, CA (US)

(72) Inventor: Bruce D. Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 98 days.

(21) Appl. No.: 15/492,063

(22) Filed: Apr. 20, 2017

(65) Prior Publication Data

US 2018/0309566 A1 Oct. 25, 2018

Related U.S. Application Data

(63) Continuation-in-part of application No. 15/491,654, filed on Apr. 19, 2017.

(51) Int. Cl.

*H04L 9/00* (2006.01)
*G06F 21/87* (2013.01)
*G06F 1/08* (2006.01)
*G06F 12/02* (2006.01)

(52) U.S. Cl.

CPC ................ *H04L 9/003* (2013.01); *G06F 1/08* (2013.01); *G06F 12/0246* (2013.01); *G06F 21/87* (2013.01); *G06F 2212/7207* (2013.01)

(58) Field of Classification Search

CPC ......... H04L 9/003; H04L 9/002; H04L 9/004; H04L 9/005; G06F 12/0246; G06F 21/87; G06F 1/08; G06F 2212/7207

See application file for complete search history.

(56) References Cited

U.S. PATENT DOCUMENTS 5,231,636 A 7/1993 Rasmussen
5,404,402 A 4/1995 Sprunk
5,416,434 A 5/1995 Kootstra
6,654,884 B2 11/2003 Jaffe et al.
6,748,535 B1 6/2004 Ryan, Jr. et al.
6,807,232 B2 10/2004 Nicholson et al.
7,417,468 B2 8/2008 Verbauwhede et al.

(Continued)

OTHER PUBLICATIONS

Xavier Charvet and Herve Pelletier, Improving the DPA Attack Using Wavelet Transform, pp. 1-15.

(Continued)

*Primary Examiner* — Nelson Giddins
(74) *Attorney, Agent, or Firm* — Hall Estill Attorneys at Law

(57) ABSTRACT

Apparatus and method for enacting data security in a data storage device, such as by protecting against a differential power analysis (DPA) attack. In some embodiments, a dithered clock signal is generated having a succession of clock pulse segments. Each of the clock pulse segments has a different respective frequency selected in response to a first random number and a different overall duration selected in response to a second random number. The different segment frequencies are selected by supplying the first random number to a lookup table, and the different segment durations are obtained by initializing a timer circuit using the second random number. The dithered clock signal is used to clock a programmable processor during execution of a cryptographic function.

20 Claims, 8 Drawing Sheets

(56) References Cited

U.S. PATENT DOCUMENTS

| | | | | |
|---|---|---|---|---|
| 7,426,629 | B2 | 9/2008 | Piry et al. | |
| 7,599,488 | B2 | 10/2009 | Kocher et al. | |
| 7,639,058 | B2 | 12/2009 | Kurokawa et al. | |
| 7,870,336 | B2 | 1/2011 | Erlingsson et al. | |
| 8,334,705 | B1 | 12/2012 | Gunnam et al. | |
| 8,427,194 | B2 | 4/2013 | Deas et al. | |
| 8,635,467 | B2 | 1/2014 | Gunnam et al. | |
| 8,847,653 | B2 * | 9/2014 | Hong | H03B 19/00 327/291 |
| 8,879,724 | B2 | 11/2014 | Kocher et al. | |
| 9,250,671 | B2 | 2/2016 | Tucker | |
| 9,343,162 | B2 | 5/2016 | Tasher et al. | |
| 9,436,603 | B1 | 9/2016 | Pohlack | |
| 2004/0091107 | A1 * | 5/2004 | Fujisaki | H04L 9/003 380/42 |
| 2008/0315928 | A1 * | 12/2008 | Waheed | G04F 10/005 327/159 |
| 2011/0200190 | A1 * | 8/2011 | Hisakado | H04L 9/003 380/46 |
| 2011/0260749 | A1 | 10/2011 | Deas et al. | |
| 2012/0005466 | A1 * | 1/2012 | Wagner | G06F 21/558 713/2 |
| 2012/0204056 | A1 | 8/2012 | Airaud et al. | |
| 2013/0007881 | A1 | 1/2013 | Liem et al. | |
| 2013/0015900 | A1 * | 1/2013 | Lisart | G06F 21/72 327/306 |
| 2015/0039910 | A1 | 2/2015 | Card | |
| 2015/0082434 | A1 | 3/2015 | Sethumadhavan et al. | |
| 2015/0365228 | A1 * | 12/2015 | Belenky | H04L 9/003 380/30 |
| 2016/0315760 | A1 * | 10/2016 | Gori | H04L 9/003 |
| 2017/0366340 | A1 * | 12/2017 | Wyseur | H04L 9/0637 |

OTHER PUBLICATIONS

Y.Zafar and D. Har, "A Novel Countermeasure Enhancing Side Channel Immunity in FPGAs," International Conference on advances in Electronics and Micro-electronics, 2008, pp. 132-137, ENICS 1008.11, IEEE, Piscataway, NJ, USA.

* cited by examiner

SECURE EXECUTION ENVIRONMENT CLOCK FREQUENCY HOPPING

RELATED APPLICATION

The present application is a continuation-in-part (CIP) of co-pending U.S. patent application Ser. No. 15/491,654 filed Apr. 19, 2017, the contents of which are hereby incorporated by reference.

SUMMARY

Various embodiments of the present disclosure are generally directed to a data storage device configured to defend against a side-channel information attack, such as a differential power analysis (DPA) attack, through the use of clock frequency hopping. In some embodiments, a dithered clock signal is generated having a succession of clock pulse segments. Each of the clock pulse segments has a different respective frequency selected in response to a first random number and a different overall duration selected in response to a second random number. The different segment frequencies are selected by supplying the first random number to a lookup table, and the different segment durations are obtained by initializing a timer circuit using the second random number. The dithered clock signal is used to clock a programmable processor during execution of a cryptographic function.

These and other features which characterize various embodiments of the present disclosure can be understood in view of the following detailed discussion and the accompanying drawings.

DETAILED DESCRIPTION

Figure 1:
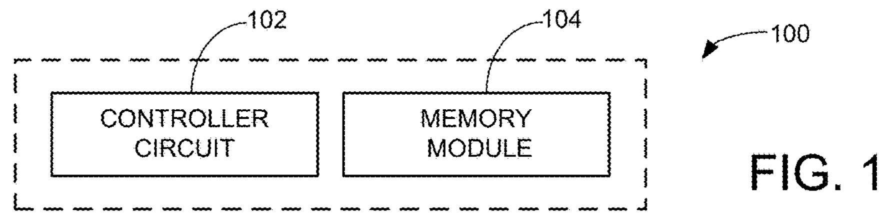
FIG. 1 is a functional block representation of a data storage system which operates in accordance with various embodiments of the present disclosure.

The present application is generally directed to data management in a data storage device, and more particularly to a method and apparatus for defending against a side-channel attack upon the data storage device, including but not limited to a differential power analysis (DPA) attack.

Data security schemes are used to reduce or eliminate unwanted access to data by unauthorized users of digital data storage systems. Data security schemes can employ a variety of security techniques in an effort to protect data. Some data security schemes employ cryptographic processes whereby data are processed, or encrypted, using a selected cryptographic algorithm to encode data in such a way that the underlying data cannot be easily recovered by an attacker. A wide variety of cryptographic functions are known in the art.

Cryptographic systems are generally operable to protect the underlying data from discovery. Even so, so-called side-channel attacks are often used by motivated attackers to glean side channels, or separate information streams, from a system that can ultimately reveal important information about the system, up to and including decoding of the data protected by the cryptographic algorithm. Side-channel attacks can take a variety of forms.

One common example of a side-channel attack involves monitoring a video channel of compressed data from a video source over time. If a camera or other data collection device captures video frames of a particular viewpoint and compresses the video data prior to transmission, the monitoring of a video stream of such data can indicate the presence (or absence) of a significant change in the viewpoint accessed by the camera. This is based on the recognition that highly compressed video data schemes tend to transmit successive frames of data with only the differences that were detected from one frame to the next.

If no significant changes have been detected in the field of view, the amount of transmitted data (and correspondingly, the amount of power or data packet size) should remain at a relatively low and constant value. On the other hand, a sudden increase in the amount of data transmitted would tend to indicate a significant change in the field of view has taken place, even if the underlying content of the visual content remained encrypted and undiscoverable.

Another well-known side-channel attack is sometimes referred to as a differential power analysis (DPA) attack. In a DPA context, an attacking party monitors differences in power consumption by an integrated circuit (IC) configured to carry out cryptographic functions. By comparing the power consumed by the IC in response to different input values, over time the attacker may be able to correlate certain inputs to different power consumption outputs.

Given enough time, the attacker may be able to discern, from the information leaking from this side-channel path, the underlying cryptographic function that is being employed to encrypt the data, various encryption keys that are being used, and so on. Even if the underlying data cannot be retrieved, DPA attacks can still provide valuable information to an attacker regarding the construction and operation of the system.

For reference, the term differential power analysis (DPA) applies to attacks that evaluate power consumption fluctuations as well as other forms of emission or consumption, such as electromagnetic radiation, heat, etc. A DPA attack may be invasive or non-invasive and, depending on the configuration, may be able to sense internal operations within a sealed enclosure such as an integrated circuit package, etc. without physically connecting to the device.

Accordingly, various embodiments of the present disclosure are generally directed to a method and apparatus for configuring a data storage device to defeat or otherwise inhibit the effectiveness of a side-channel informational attack carried out upon a data storage device, including but not limited to a differential power analysis (DPA) attack.

As explained below, some embodiments generally involve using programming in a memory executed by a programmable processor to perform a cryptographic function involving multiple logical computations to arrive at an output value responsive to an input value over a time interval. The operations carried out by the processor are governed (clocked) by an input clock signal.

A dithered clock generation circuit is used to provide a dithered, or variable, clock input signal to the programmable processor during the execution of the cryptographic function. The dithered clock generation circuit uses first and second random numbers generated by a random number source. The first random number is used to identify a selected variable frequency for the programmable processor. The second random number is used to select a variable interval for the application of the selected variable frequency. Over the course of the execution of the cryptographic function, the dithered clock signal will include a number of different frequency segments each of which is applied for a variable amount time.

The variable frequencies of the dithered clock signal are each formed as a different combination of a plurality of a set of available frequencies. A one sided distribution of frequencies is used which includes a maximum (first) frequency and a plurality of sub-frequencies lower than the first frequency.

A lookup table data structure in a memory location has entries corresponding to each of the sub-frequencies arranged in a non-uniform fashion. The first random number is used as an input to the table and, responsive to the respective bit values of the first random number, the respective sub-frequencies are combined with the first frequency to generate a clock selection input to a clock multiplexer (mux). The mux operates to combine the respective input sub-frequencies to output the dithered clock signal. Embodiments are provided that respectively use a glitchless clock mux and a synchronous clock mux.

These and other features and advantages of various embodiments can be understood beginning with a review of FIG. 1 which provides a generalized functional block diagram of a data storage device 100. The data storage device 100 includes a controller circuit 102 and a memory module 104. The controller circuit 102 is a hardware-based or programmable processor that provides top level control of the device 100. The memory module 104 comprises non-volatile memory such as but not limited to rotatable memory and/or solid-state memory.

The data storage device 100 can take any number of forms including a hard disc drive (HDD), a solid-state drive (SSD), a hybrid drive, an optical drive, a thumb drive, a memory card, integrated memory within an electronic device such as a computer, tablet, smart phone, appliance, work station, server, etc. The controller functionality can be incorporated directly into the memory module as desired.

Figure 2:
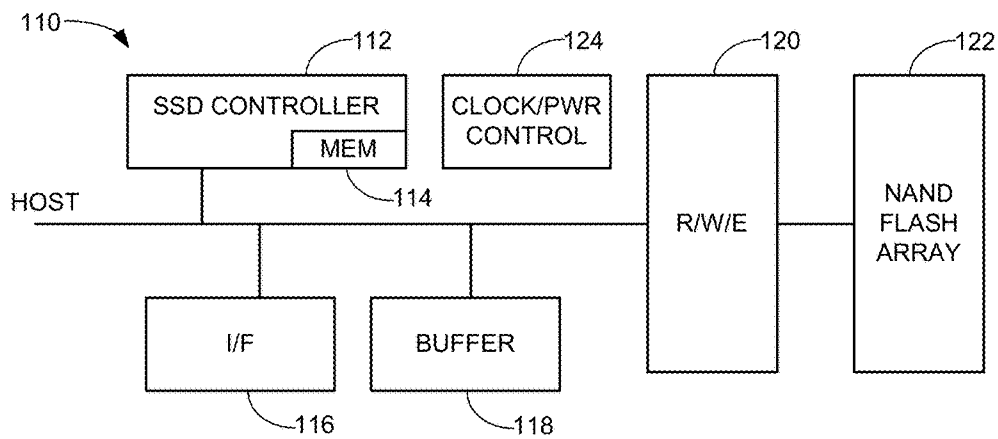
FIG. 2 shows a data storage device as in FIG. 1 configured as a solid state drive (SSD) with solid-state non-volatile NAND flash memory cells to store data in accordance with some embodiments.

FIG. 2 depicts aspects of a data storage device 110 generally similar to the data storage device 100 of FIG. 1. The device 110 is characterized as a solid state drive (SSD), although this is merely for purposes of illustration and is not limiting.

An SSD controller 112 generally corresponds to the controller circuit 102 of FIG. 1 and includes one or more programmable processors with associated programming stored in local SSD controller memory (MEM) 114. An interface (I/F) circuit 116 coordinates transfers of commands and data between the SSD 110 and a host device. A buffer memory 118 may constitute volatile local buffer memory such as DRAM and/or SRAM to temporarily store user data during data transfer operations.

A read/write/erase (R/W/E) circuit 120 has the requisite functionality to carry out read, write (programming) and erasure functions upon a NAND flash memory array 122. The R/W/E circuit 120 and NAND flash memory array 124 may be incorporated in the memory module 104 of FIG. 1. The memory array 122 may include two dimensional (2D) or three dimensional (3D) NAND flash memory cells. The memory array 122 may further comprise individual flash memory cells configured as single level cells (SLCs), multi-level cells (MLCs), three-level cells (TLCs), etc.

A clock and power control circuit block is denoted at 124. The control circuit block 124 is operative to supply appropriate rail voltages (e.g., 3.3V, etc.) and clock signals to the various circuits of the SSD 110 during powered operation.

Figure 3:
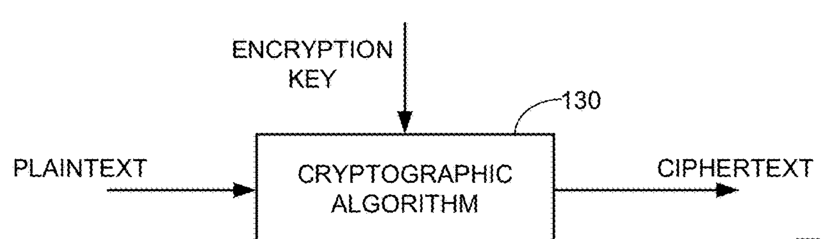
FIG. 3 shows a cryptographic algorithm block configured to carry out a cryptographic function upon input plaintext to form output cyphertext in some embodiments.

FIG. 3 shows a cryptographic algorithm block 130 which forms a portion of the SSD 110, such as but not limited to the SSD controller 112. The block 130 generally operates to transform input data, referred to as plaintext, into output data referred to as ciphertext. This transformation is carried out using a selected cryptographic transform in accordance with one or more input parameters, such as an encryption key. Other input parameters can be used such as seed values, counter values, data addresses, etc.

It is contemplated that input user data supplied by the host device may be subjected to one or more levels of encryption to provide encrypted data that are stored by the NAND flash memory 122. The plaintext data represented in FIG. 3 may be in the form of unencrypted data, or may be data that have been previously encrypted by an upstream encryption process. Generally, a cryptographic function as defined herein is a function that is configured to increase the entropy of an input set of data toward the purpose of enhancing data security.

Substantially any cryptographic function can be used by the block 130 to transform the input plaintext data to provide the output ciphertext data, including but not limited to AES algorithms, hash functions, public/private key encryption algorithms, cipher block chaining (CBC) encryption algorithms, XTS mode (XOR/Encrypt/XOR based encryption with ciphertext stealing algorithms, etc.

Figure 4:
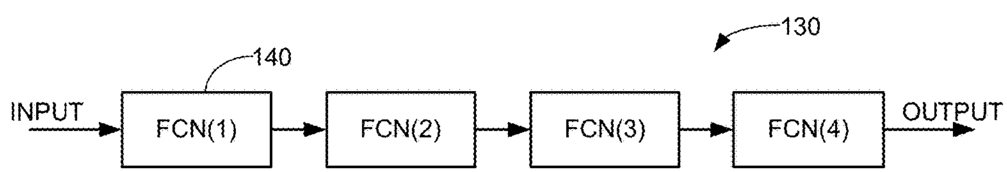
FIG. 4 shows a sequence of cryptographic functions that may be carried out in succession to effect the cryptographic algorithm of FIG. 3.

FIG. 4 shows a simplified functional block representation of the operation of the cryptographic algorithm block 130 of FIG. 3, broken up into a sequence of individual function blocks 140 that represent a series of combinatorial functions (FCN(1) to FCN(4)) that are successively carried out to perform the overall function of block 130. It will be appreciated that the specific number and type of functions will depend upon the form of the underlying cryptographic algorithm of block 130. Nevertheless, from FIG. 4 it can be seen that, for a given cryptographic algorithm, there will be a defined sequence of operations (e.g., addition, multiplication, data shifts, etc.) that are sequentially employed to generate the output ciphertext irrespective of the value of the input plaintext.

This functional arrangement of the operation of block 130 is necessary to ensure that, whatever sequence of transformations have been applied to a given set of input data, such operations are both repeatable and reversible. A cryptographic function needs to be repeatable in such a way that, for a given input value (plaintext), the same output value (ciphertext) is produced each time, or is otherwise obtainable from the output value. A cryptographic function needs to be reversible in such a way that, for a given set of encrypted ciphertext, the originally presented input data can be extracted and returned.

It follows that substantially all cryptographic algorithms may be susceptible to one or more types of side-channel attacks to detect information that leaks from the system. This is true even if steps are taken to protect the particular sequence carried out by the cryptographic algorithm, as well as the various inputs (e.g., encryption keys, seed values, etc.). Of particular interest to the present discussion are differential power analysis (DPA) attacks, which can be used to disclose important information to an attacker which, in some cases, may enable the attacker to not only discern the type of encryption used, but can also reveal particular state values as well such as the individual encryption keys, seed values, etc. that were used in the encryption process. The various techniques disclosed herein, however, are suitable to protect against other forms of side-channel attacks as well.

Figure 5:
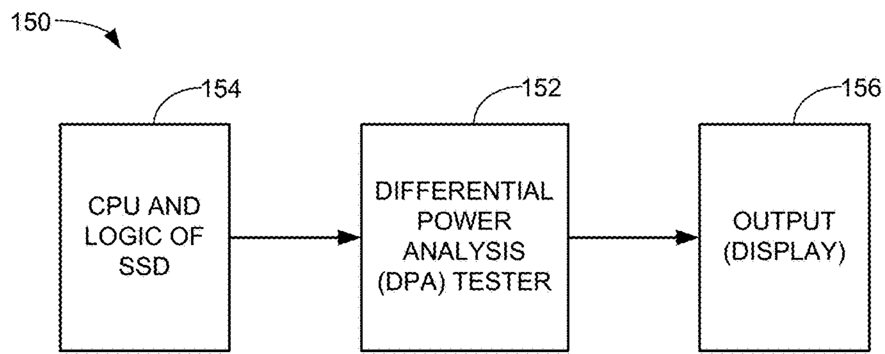
FIG. 5 is a functional block diagram of a system configured to carry out a differential power analysis (DPA) attack upon the data storage device of FIG. 2.

FIG. 5 shows an evaluation system 150 of the type that may be used by an attacker to obtain information regarding the cryptographic algorithm utilized by block 130 in FIG. 3. It is presumed that the attacker has obtained physical custody and control of the SSD 110 and can access various circuits of the device, either directly and/or indirectly, including the clock/power control circuit 124 of FIG. 2.

A differential power analysis (DPA) tester device 152 accesses the device 110 to observe changes in consumption/emission characteristics of the device during operation. In at least some cases, the tester device 152 operates to sense variations in instantaneous power consumed by of a programmable processor (central processing unit, CPU) and associated logic 154 as particular inputs are supplied to the cryptographic algorithm block 130. Other forms of emissions may be detected during a DPA analysis, such as but not limited to electromagnetic radiation, thermal variation, etc.

Even if the tester 152 merely observes operation of the device 110 without being able to expressly enforce certain inputs, valuable information can still be collected over time with regard to the operation of the circuit. This output information can be collected by an output device 156, which may include a visual display feature (e.g., a computer monitor, etc.).

Figure 6:
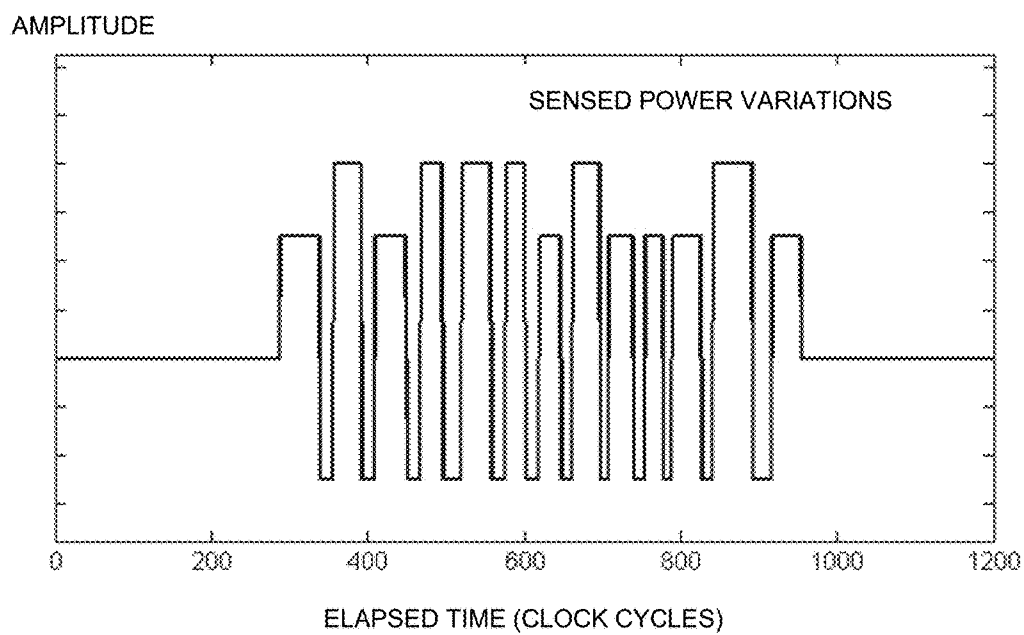
FIG. 6 is a graphical representation of exemplary clock signal transitions that may be sensed using the DPA attack equipment of FIG. 5 in some embodiments.

FIG. 6 is a simplified DPA analysis timing diagram showing various sensed power variations during the operation of the CPU/logic block 154 of FIG. 5. The DPA analysis endeavors to discern internal information by observing instantaneous power pin voltage variations during operations using that information. These variations can result from execution conditional on whether a "0" or "1" is encountered in the processed values.

System noise of greater power generally obscures simple observation of these minute variations, but attackers can use statistical methods to extract the small variations of interest from the noise via repetitive capture of power pin variation during code execution for a sequence of interest. The higher and lower magnitudes of the various power variations in FIG. 6 can, over time, be correlated to different input and output data sequences.

Figure 7:
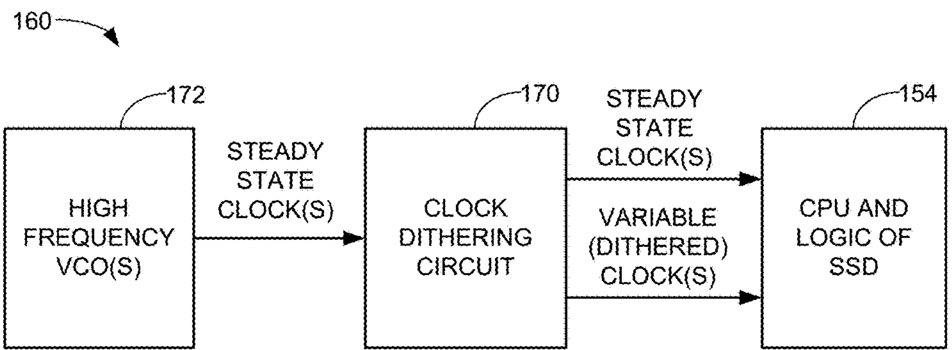
FIG. 7 is a functional block diagram of operational circuits of the data storage device of FIG. 2 configured in accordance with some embodiments to defeat the DPA attack equipment of FIG. 5.

FIG. 7 shows a cryptographic protection circuit 160 of the SSD 110 constructed and operated in accordance with various embodiments to defend against side-channel attacks and analyses as described by FIGS. 5 and 6. As explained below, the circuit 160 selectively implements a secure execution environment at times during which sensitive cryptographic functions are being executed by the CPU/logic 154.

This is carried out using a clock dithering circuit 170 which receives one or more standard, steady state clock signals from conventional clock generation circuitry such as one or more voltage controlled oscillators (VCOs) 172, and generates one or more variable (dithered) clock signals that vary both in frequency and interval.

The dithered clock signals are utilized as a countermeasure to DPA attacks by varying the times when power transitions such as illustrated in FIG. 6 step from one level to another to decorrelate the timing of events in the repetitive traces that may otherwise be obtained during an attack. A so-called protection mode is selectively enabled by the CPU firmware at appropriate times to switch in the dithered clock signal. At other times, the VCOs 172 supply the normal, non-dithered (steady state) clock signals to the CPU/logic 154.

While VCOs are used to generate clock signals in various disclosed embodiments, such is merely exemplary and is not limiting. Other forms of oscillators (oscillator circuits) can be utilized, including but not limited to phase lock loop (PLL) synthesizers, crystal oscillators, etc.

Figure 8:
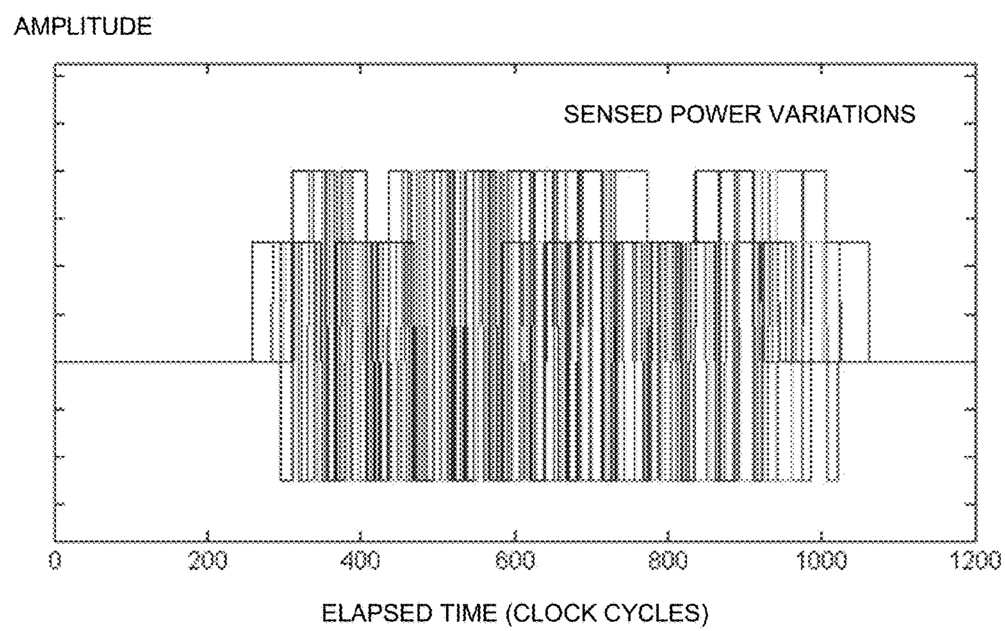
FIG. 8 shows a graphical representation of exemplary dithered clock signal transitions that may be sensed by the DPA attack equipment using the circuits of FIG. 7.

FIG. 8 is a graphical illustration of a number of overlaid power variation traces as in FIG. 6 during activation of the protection mode. It can be seen that the variable frequencies of the dithered clock signal mask the underlying transitions carried out by the processing of different values by the CPU.

Figure 9:
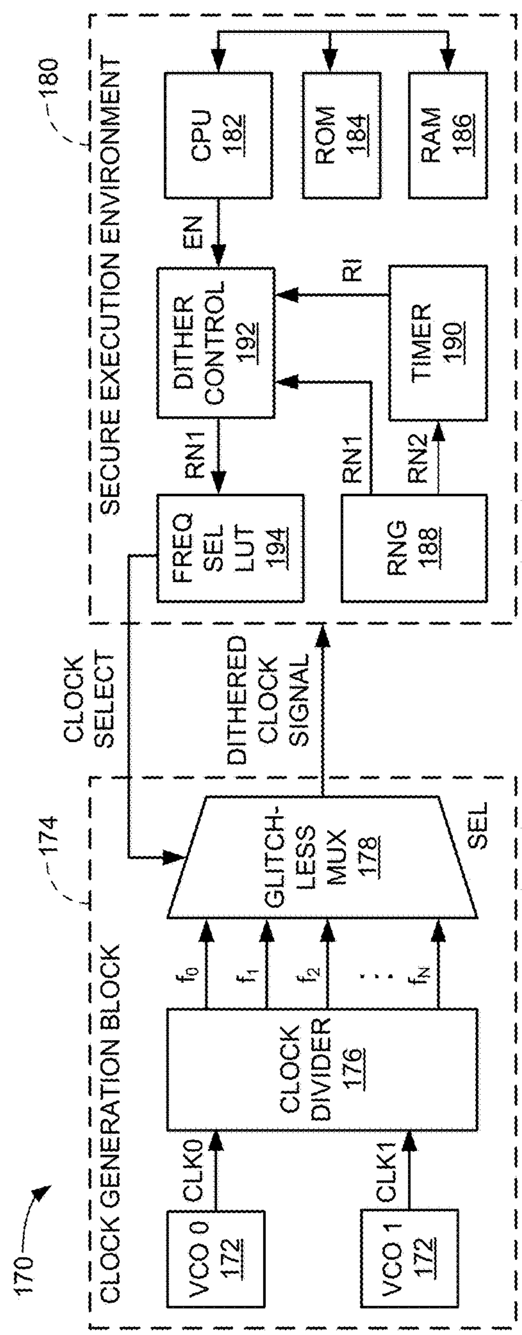
FIG. 9 shows a clock dithering circuit of the storage device that uses a glitchless clock multiplexer (mux) in accordance with some embodiments.

FIG. 9 shows the clock dithering circuit 170 in accordance with some embodiments. Generally, a clock generation block generates a range of frequencies derived from existing system reference clock signals. When the protection mode is enabled (sometimes referred to as clock hopping), the dithered clock signal is glitchlessly switched from the steady state clock to a randomly selected frequency. This randomly selected frequency is applied for a randomly selected interval, after which a new, randomly selected frequency is applied for a second randomly selected interval, and so on. A minimum interval time is imposed to limit impact of clock stalls between glitchless switches in the dithered clock frequency, and a maximum interval time is imposed to ensure sufficient time spreading of events while hopping is enabled.

With reference to FIG. 9, the clock generation block is denoted at reference numeral 174, and includes the aforementioned VCOs 172 (VCO 0 and VCO 1) as well as a clock divider circuit 176 and a glitchless clock multiplexer 178. The respective VCOs 172 generate separate clock signals CLK 0 and CLK 1 at two separate and distinct frequencies. Ring oscillators or other mechanisms may be used to provide asynchronous (e.g., relatively prime) clock values so that one clock signal is not a multiple or harmonic of the other.

The clock divider circuit 176 combines the respective clock signals CLK 0 and CLK 1 to output a range of input clock signals with frequencies from $f_0$ (maximum) to $f_N$ (minimum). The respective relationships among the various frequencies can vary. As before, the frequencies can be multiples, harmonics or relatively prime as desired. The glitchless mux 178 combines the input frequencies to output the dithered clock signal responsive to a clock select input signal.

As will be recognized, a glitchless mux such as 178 features circuitry that ensures that the mux does not output any glitches, or timing violations, when switching between different frequencies. A glitch may arise as a pulse on the clock line with an assertion time that is shorter than the minimum specified assertion time required by the logic that uses the clock signal. Glitchless muxes are particularly useful when switching among asynchronous clock signals, such as when one signal just featured a positive edge and the signal to which the mux is switching has a negative edge some fraction of time after the switching operation takes place. The glitchless mux ensures that the minimum high and low pulse widths are maintained, such as by stretching out a clock cycle as necessary.

The dithered clock signal output by the glitchless mux 178 is provided to a secure execution environment (SEE) 180. The SEE 180 is characterized as a portion of the SSD circuitry that is protected by the dithered clock signal. The SEE 180 may be extended to cover any desired portion of the SSD control circuitry, including additional clocked hardware and/or programmable processing circuits not shown in FIG. 9.

The SEE 180 includes a programmable processor (CPU) 182, read only memory (ROM) 184 and random access memory (RAM) 186. The ROM 184 may store firmware (FW) as programming instructions carried out by the CPU 182 during cryptographic functions as well as during other operational modes. The RAM 186 may store data and security values (e.g., keys, counter values, etc.) used during such processing.

The SEE 180 further includes a random number generator (RNG) circuit 188, a timer circuit 190, a dither control circuit 192 and a frequency selection lookup table (LUT) 194. Other configurations can be used so the arrangement of FIG. 9 is merely exemplary and is not limiting. The CPU 182 switches between normal mode (steady state clock) and protection mode (dithered clock) by issuing a dither enable (EN) signal to the dither control circuit 192.

The random number generator (RNG) circuit 188 is configured to output random or pseudo-random numbers over a selected range that approach truly random numbers. The RNG circuit 188 can take a variety of forms, including a ring oscillator circuit, a table of previously generated random numbers, an entropy source and entropy extraction circuit, a cryptographic function, etc. The random numbers are contemplated as comprising multi-bit random values of selected length.

A first random number (RN1) is supplied by the RNG circuit 188 to the dither control circuit 192, and a second random number (RN2) is supplied to the timer circuit 190. Multiple sets of first and second random numbers will be successively used during a given protection mode session. In some cases, predetermined scripts of the random numbers may be used so long as sufficient entropy is present to not enable the protection scheme to be predicted, compensated and defeated.

The dither control circuit forwards the first random number (RN1) or a selected number of bits therefrom, such as the lower M bits, to the frequency selection lookup table 194. In response, the table 194 outputs a clock select input value to the mux 178. It is contemplated that clock select input value from the table 194 will be a multi-bit digital value configured to select among the various input pins of the mux 178. The mux will connect the selected one of the input frequencies (main frequency $f_0$ or one of the sub-frequencies $f_1$ to $f_N$) to the output line of the mux to supply the dithered clock signal.

The second random number (RN2) is forwarded to the timer circuit 190, which initiates a count to mark a selected time interval having a duration corresponding to the second random number. In some cases, the timer circuit 190 may be a countdown timer so that the multi-bit random number initializes the timer to an initial value, after which the timer proceeds to count down to 0 or some other final value at a suitable clock rate. Other forms of timer circuit can be used, so long as the circuit initiates a variable elapsed amount of time corresponding to the input selected random number.

At the conclusion of the time interval, the timer circuit 190 provides a random interrupt (RI) value to the dither control circuit 192. In response to the RI value, a new clock select value is output by the frequency select lookup table 194 and the timer circuit is reset to a new initial random value based on another second random number from the RNG 188. In this way, the dithered clock signal is formed as a sequence of frequency segments, each segment comprising alternating clock pulses at a different respective frequency determined in relation to a first random number (RN1) and having an overall duration that is determined in relation to a second random number (RN2).

Figure 10:
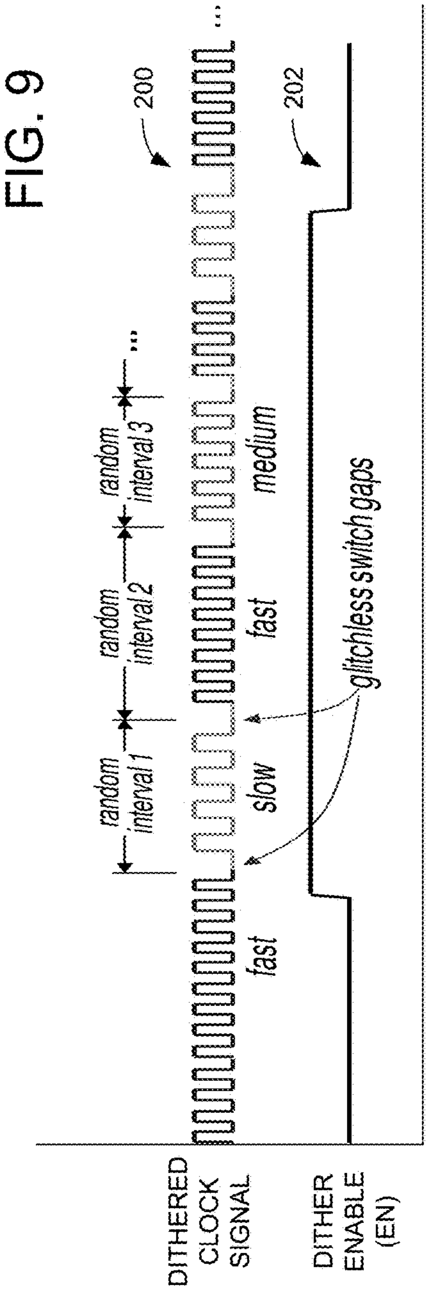
FIG. 10 is a timing diagram to illustrate a dithered clock signal output by the circuit of FIG. 9.

FIG. 10 is a graphical representation of a dithered clock signal 200 and a dither enable (EN) signal 202 generated by the circuit 170 of FIG. 9 in some embodiments. The dithered clock signal 200 remains at a maximum value (e.g., frequency $f_0$) during normal mode operation (e.g., while EN signal 202 is deasserted low) and varies as shown upon the assertion of the EN signal 202 during protection mode. Respective slow, medium and fast frequency segments are depicted as the system switches among the various available frequencies $f_0$ to $f_N$. Glitchless switch gaps are indicated with extended low pulse lengths as the mux 178 switches from one asynchronous clock frequency to the next.

Figure 11:
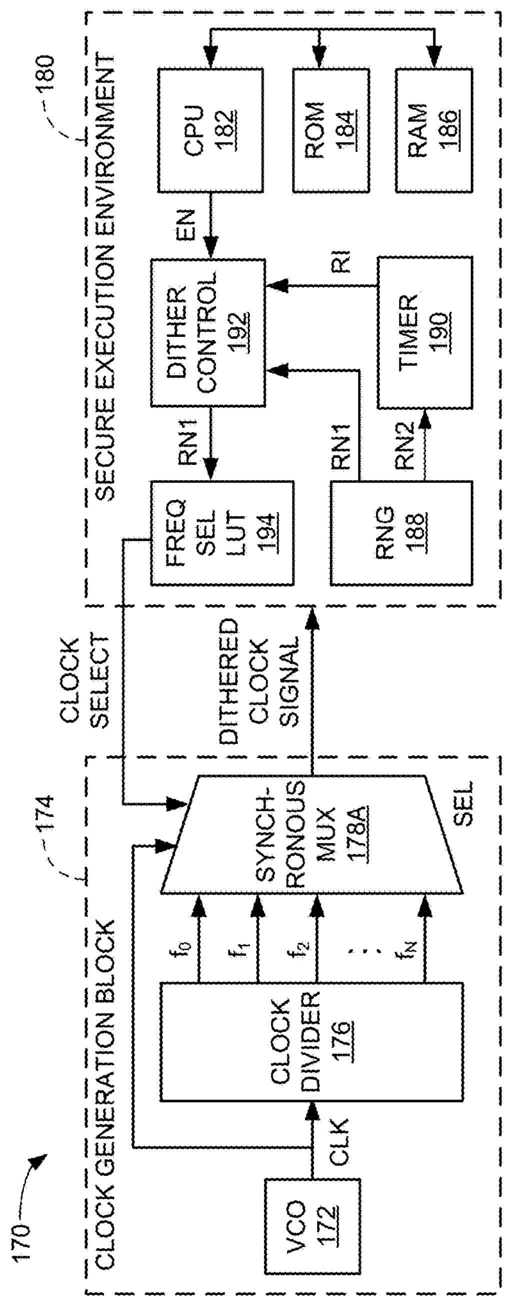
FIG. 11 shows a clock dithering circuit of the storage device that uses a synchronous clock mux in accordance with further embodiments.

FIG. 11 shows the clock dithering circuit 170 of FIG. 7 in accordance with further embodiments. The configuration of FIG. 11 is similar to the configuration of FIG. 9, and so like reference numerals have been used in both figures to denote similar components.

One difference between FIG. 9 and FIG. 11 is that FIG. 11 utilizes a synchronous clock mux 178A instead of the glitchless clock mux 178 of FIG. 9. As will be recognized, a synchronous mux such as 178A can be used when all the input clocks have a known phase relationship, as would be the case when all of the frequencies $f_0$ to $f_N$ are divided down from a single master clock (CLK from master VCO 172). Synchronous muxes tend to implement glitch protection, such as by using the master clock signal CLK as shown to time transitions from one frequency to the next.

As with FIG. 9, the circuit 170 as configured in FIG. 11 operates to select a variable frequency using a first random number (RN1) for a duration established in relation to a second random number (RN2). The foregoing operation generally repeats during protection mode, as before.

Figure 12:
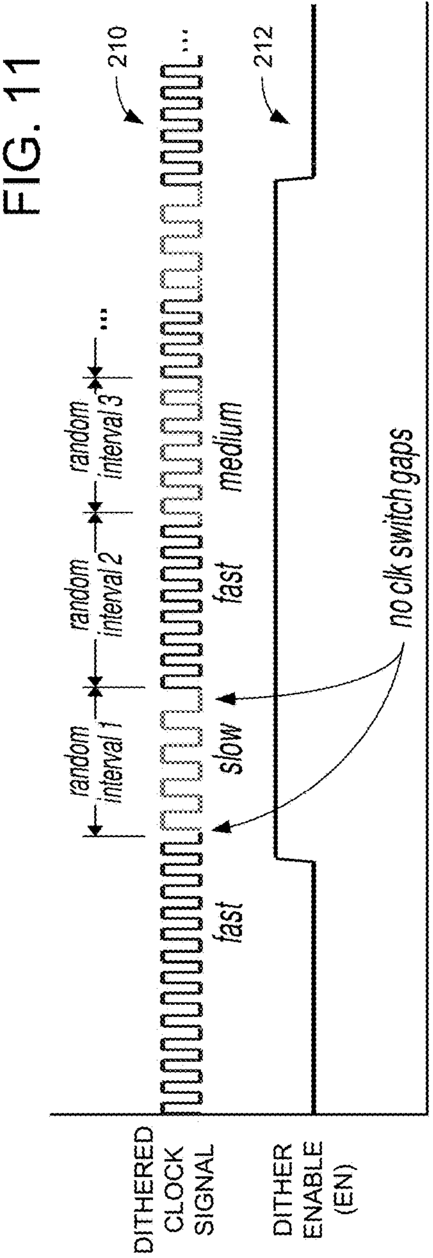
FIG. 12 shows a timing diagram to illustrate a dithered clock signal output by the circuit of FIG. 11.

FIG. 12 illustrates a dithered clock signal 210 and a dither enable (EN) signal 212 generated by the circuit 170 in FIG. 11 in some embodiments. The maximum frequency $f_0$ is applied during normal mode, and variable frequencies are applied during protection mode. A comparison of FIG. 12 to FIG. 10 shows an improvement in the transitions between successive frequency segments due to the operation of the synchronous mux 178A. Nevertheless, the use of asynchronous clocks and a glitchless mux as in FIGS. 9 and 10 may provide more decorrelation among successive traces.

Figure 13:
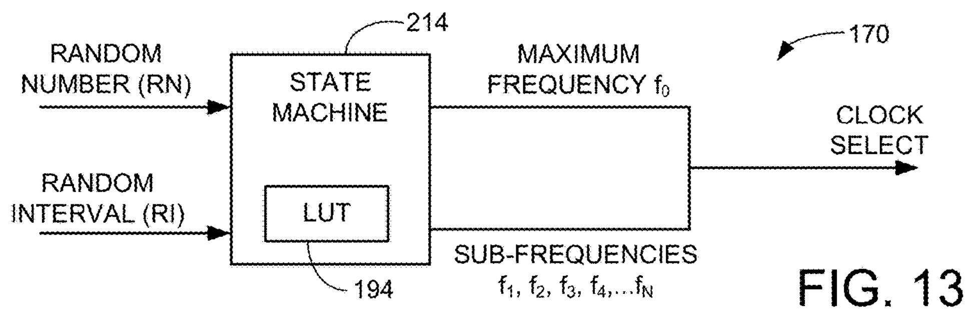
FIG. 13 illustrates a state machine of the clock dithering circuit operative in some embodiments.

FIG. 13 shows further aspects of the clock dithering circuit 170 in accordance with some embodiments. A state machine 214 of the control circuit 192 can be configured to operate to switch between the maximum frequency f0 and a selected one of the sub-frequencies $f_1$ to $f_N$ at each transition. In this scheme, during protection mode a first randomly selected sub-frequency will be selected for a first frequency segment, followed by the maximum frequency for a second frequency segment, a second randomly selected sub-frequency for a third frequency segment, the maximum frequency for a fourth frequency segment, and so on. Such operation is exemplary and is not limiting, as other embodiments can be configured to randomly select a different one of the available frequencies for each segment. Nevertheless, the interjection of the maximum frequency between sub-frequencies can help to provide a higher overall net frequency to the secure execution environment (SEE 180), thereby enhancing processing efficiency while still masking the individual clock transitions as in FIG. 8.

Figure 14:
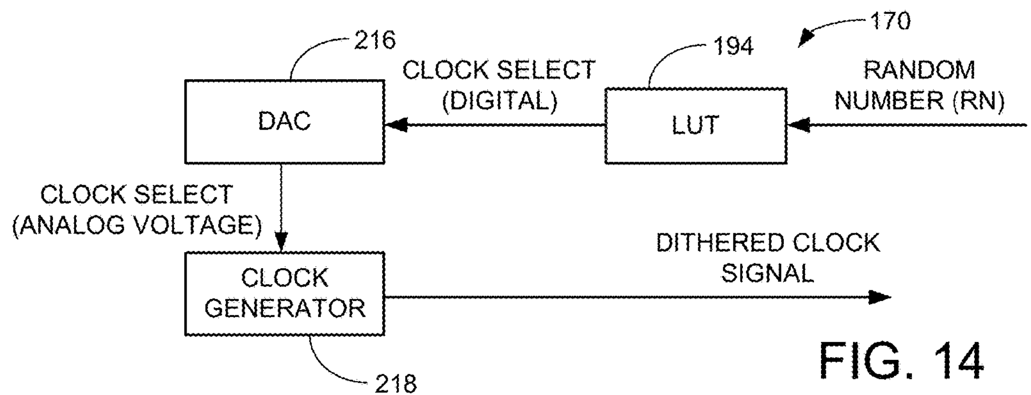
FIG. 14 shows the use of a digital-to-analog converter (DAC) and dither VCO to generate the dithered clock signal in further embodiments.

FIG. 14 shows another alternative configuration for the clock dithering circuit 170. Instead of using a mux as a variable clock circuit to select the output clock signal as in FIGS. 9 and 11, the multi-bit digital output clock select value is supplied by the frequency selection lookup table 194 to a digital-to-analog converter (DAC) 216, which converts the multi-bit digital clock select value to a corresponding analog voltage. The analog voltage is supplied as an input to a clock generator circuit 218 which operates as a variable clock circuit to adjust the frequency of the output dithered clock signal in response to the magnitude of the input analog voltage control signal.

The use of an analog input voltage to control the output (dithered) clock rate can be implemented in a variety of ways. In one embodiment, the clock generator circuit 218 can be realized as a voltage controlled oscillator (VCO), which outputs a variable (dithered) clock signal responsive to the magnitude of the analog input voltage.

While operable, those skilled in the art will appreciate that at least some VCOs tend to output frequencies that vary with environmental effects such as power supply voltage and temperature. Thus, even with a constant control voltage, some variability may be present in the output clock rate. While advantageously increasing the variability (entropy) in the system, such open loop operation may also lead to instability problems with the SEE circuitry in some cases.

Figure 15:
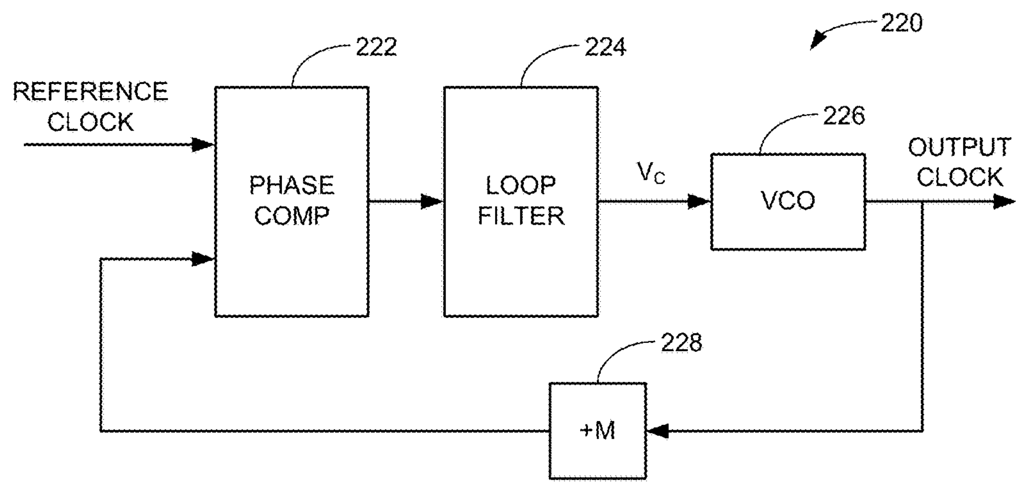
FIG. 15 shows a frequency control circuit in conjunction with the circuit of FIG. 14.

VCOs and other forms of oscillator circuits are sometimes operated using a closed loop configuration to compensate for these and other environmental effects. FIG. 15 shows an oscillator (PLL synthesizer) circuit 220 having a phase comparator (comp) circuit 222 which compares a feedback frequency to a reference clock frequency. An output error signal from the comparator circuit 222 is filtered by a loop filter 224 to generate a control voltage $V_C$, which serves as an input value to a VCO 226. Because the output clock frequency from the VCO 226 is nominally M times the reference frequency, a frequency divider block 228 divides the output clock frequency by M.

The closed-loop circuit arrangement of FIG. 15 is configured to nominally maintain the output clock rate at a constant frequency. Merely injecting the analog input signal from FIG. 14 into the VCO 226 of FIG. 15 would not be operable to adjust the output frequency to a significant degree, since the frequency error signal generated by the comparator 222 would tend to counteract the variations presented to the VCO 226 by this external analog input voltage.

One solution would be to switch between closed loop operation as provided in FIG. 15 and open loop operation as in FIG. 14. This could be carried out either through the use of separate clock circuits, or through the use of a combined circuit as will now be discussed in FIG. 16.

Figure 16:
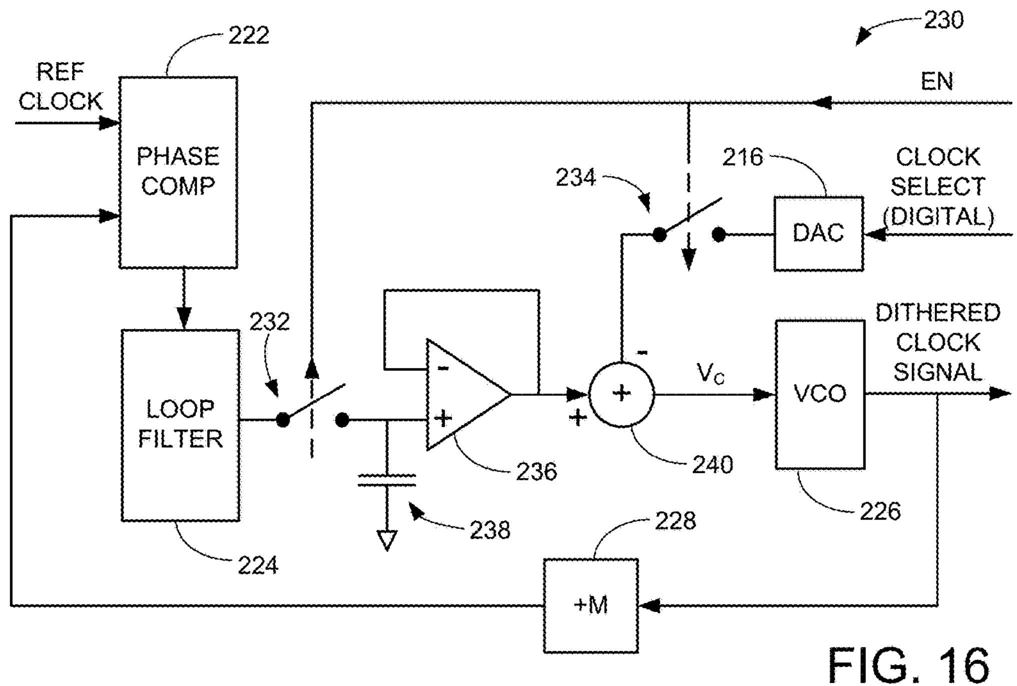
FIG. 16 shows another frequency control circuit in conjunction with the circuit of FIG. 14.

FIG. 16 provides another oscillator (PLL synthesizer) circuit 230 in accordance with further embodiments. The circuit 230 is similar to the circuit 220 from FIG. 15, and so like reference numerals are used for similar components. The circuit 230 includes the DAC 216 from FIG. 14, as well as first and second switching devices (switches) 232, 234, a track and hold amplifier (amp) 236, a filtering capacitor 238 and a summing junction 240. Other arrangements can be used.

Inputs include the reference clock signal from FIG. 15, a switching enable (EN) signal such as from the dither control circuit 192 of FIGS. 9 and 11, and the digital clock select output from the lookup table 194 as variously discussed above in FIGS. 9, 11 and 13-14. The first and second switches 232, 234 may take the form of transistors which are respective opened or closed responsive to the state of the EN signal.

The circuit 230 operates as discussed above to switch between the normal maximum frequency and some randomly selected lower frequency during dithering mode, and leverages the fact that the time of operation at each of the lower frequencies is bounded.

During normal (non-dithered) operation, the first switch 232 is closed and the second switch 234 is open. With the first switch 232 closed, the track & hold amp 236 tracks the input value from the loop filter 224 (e.g., acts like a wire conductor). Because the second switch 234 is open, the DAC 216 does not alter the control voltage $V_C$. It will be noted that in this state, the operation of the circuit 230 of FIG. 16 will largely conform to the circuit 220 in FIG. 15 and output a fixed frequency that is M times the reference clock frequency.

The assertion of the dither EN signal high opens the first switch 232 to decouple the closed loop control provided by blocks 222, 224 and 228, and closes the second switch 234 to present summing junction 240 with the analog input voltage from the DAC 216.

With the first switch 232 open, the track and hold amp 236 maintains a base control voltage as the voltage that was needed to keep the VCO running at the normal frequency at the time the switch was opened. With the second switch 234 closed, the output voltage from the DAC 216 is subtracted from this base control voltage to provide a lowered control voltage to the VCO, and the VCO drops to a correspondingly lower frequency.

The dither EN signal in FIG. 16 can thus be switched (toggled) between an asserted (e.g., high) level to a deasserted (e.g., low) level by the dither control circuit 192 at times determined by the random interval (RI) values received from the timer 190. Each deasserted interval will result in a segment in the dithered clock signal at a closed loop maximum frequency, and each asserted interval will result in a segment in the dithered clock signal at an open loop, reduced, and randomly selected frequency.

The dither control circuit 192 will thus repetitively toggle the dither EN signal shown in FIG. 16 during protection mode (e.g., when the CPU based EN signal in FIGS. 9 and 11 is asserted by the CPU 182 to initiate the dithered clock), and maintain the dither EN signal in FIG. 16 constantly in a deasserted state during normal mode (e.g., when the CPU based EN signal in FIGS. 9 and 11 is deasserted by the CPU).

It will be noted that the dither enabled mode of operation is essentially open loop, and thus has the potential of frequency drift and other instabilities discussed above. However, the duration of each lower frequency segment is bounded, so it is contemplated that any instabilities will be manageable by the system. Each time the dither EN signal is deasserted, the system resumes closed loop operation at the maximum frequency, and the track and hold amp will acquire whatever new voltage is necessary to operate the VCO at the normal maximum frequency for the environmental conditions at that time.

Figure 17:
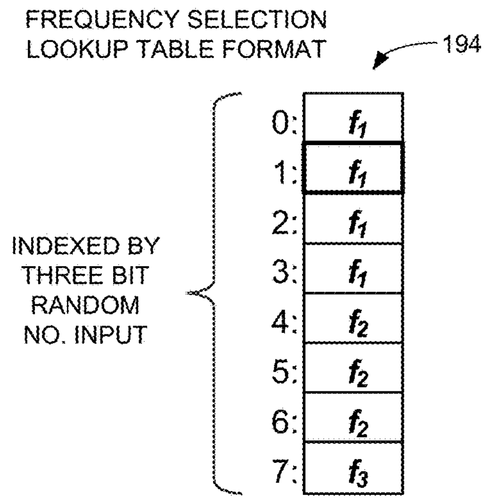
FIG. 17 shows a frequency selection lookup table format from FIGS. 9 and 11 in some embodiments.

FIG. 17 shows an exemplary format for the frequency selection lookup table 194 in some embodiments. The table in FIG. 17 is arranged with eight (8) entries to enable indexing by a three (3) bit random number. Other arrangements can be used. Each entry stores an associated frequency value. In this case, a total of four (4) different clock frequencies are used in the dithered clock signal: sub-frequencies $f_1$, $f_2$ and $f_3$, plus the maximum (first) frequency $f_0$. The table only includes frequency values for the three sub-frequencies $f_1$, $f_2$ and $f_3$ on the basis that the state machine 214 of FIG. 13 automatically inserts the maximum frequency $f_0$ between each lower frequency interval. In an alternative embodiment, a frequency value corresponding to the maximum frequency $f_0$ can be included in the table as well and the state machine does not automatically insert the maximum frequency between sub-frequency segments.

The table 194 is programmable by the CPU 182 so as to be adjustable as desired. A non-uniform distribution of the frequency values is provided in the table: four (4) entries (entries 0-3) are assigned frequency $f_1$, three (3) entries (entries 4-6) are assigned frequency $f_2$, and one (1) entry (entry 7) is assigned frequency $f_3$. Other non-uniform distributions of the frequency values can be used. The use of a larger number of frequency values for higher frequencies in the table serves to bias the overall distribution toward a higher net dithered clock frequency to mitigate the performance loss of the net frequency reduction that arises during performance mode. The net (or average) frequency $f_{NET}$ of the dithered clock signal can be determined as follows:

$$f_{NET} = \frac{(8f_0 + 4f_1 + 3f_2 + f_3)}{16} \quad (1)$$

Figure 18:
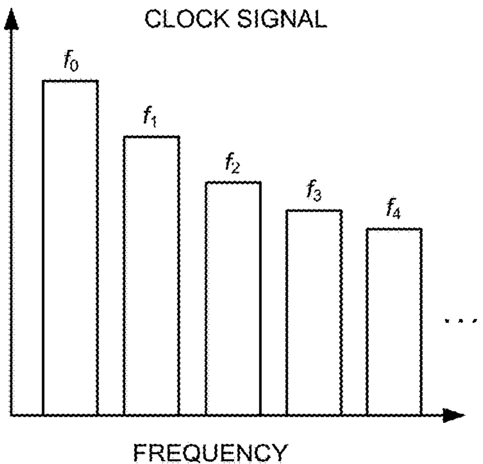
FIG. 18 is a graphical representation of a one-sided frequency distribution of input frequencies of the type that can be combined to form the dithered clock signal.

FIG. 18 is a graphical representation of various frequencies that can be used as inputs to form the dithered clock signal. As noted above, any number of and relationship between the various frequencies can be used as desired.

Figures 19, 20:
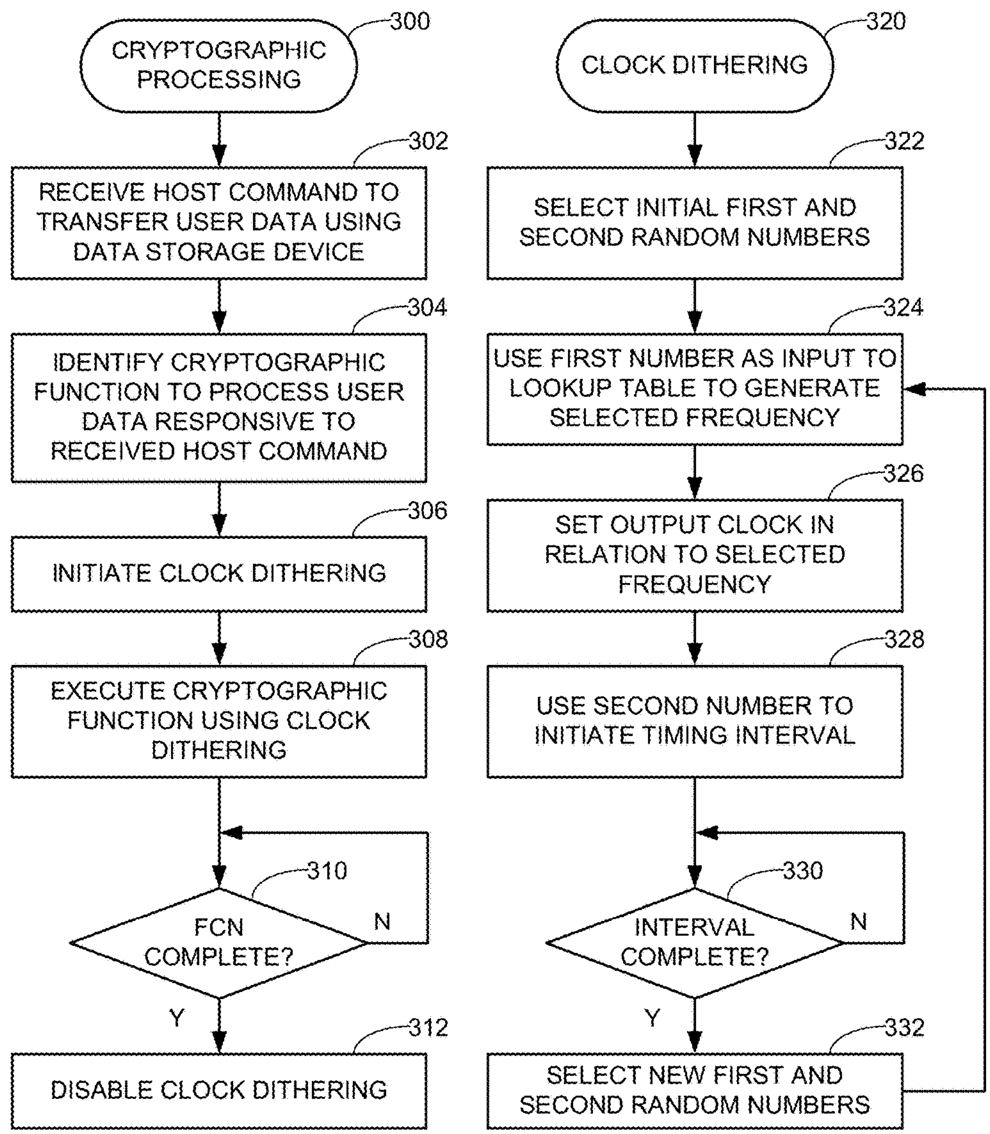
FIG. 19 is a flow chart for a cryptographic processing routine illustrative of steps carried out by various embodiments to protect against DPA attacks such as illustrated in FIG. 5.
FIG. 20 is a clock dithering routine illustrative of steps that may be carried out during the routine of FIG. 19.

FIG. 19 is a flow chart for a cryptographic processing routine 300 illustrative of steps carried out by the SSD 110 in accordance with the foregoing discussion. The various steps are merely exemplary and may be appended, modified, carried out in a different order, etc.

At step 302, a host command is received to transfer user data between the host device and the SSD 110. The host command may take the form of a write command in which input user data received from the host device are to be encrypted prior to storage in the NAND flash memory array 122. Alternatively, the host command may take the form of a read command in which previously stored and encrypted user data are subsequently retrieved, decrypted, and returned to the host device. Other forms of host commands may be received as well that initiate operation of the encryption/decryption functions of the SSD.

At step 304, a selected cryptographic function is identified suitable for use with selected user data associated with the host command. It is contemplated that the cryptographic function will be executed by the CPU 182 as well as other logic circuitry as desired within the secure execution environment (SEE) 180 of the SSD. Clock dithering is initiated at step 306 to provide a dithered clock signal to the SEE. This is initiated by providing the dither enable (EN) signal by the CPU 180 to the dither control circuit 192. The cryptographic function is thereafter initiated by the CPU at step 308 using the dithered clock signal to clock the CPU and other logic as required.

Decision step 310 determines whether the cryptographic processing is completed; if not, the dithered clock signal continues to be applied until such time that the function has been completed, after which the clock dithering is disabled at step 312 by the CPU. It is contemplated that, depending on workload, the CPU 182 may switch in and out of clock dithering repetitively to process large amounts of cryptographically encoded data, and that the system can easily adjust between steady state clock mode and dithered (protection) mode as required.

FIG. 20 provides a clock dithering routine 320 which is executed in response to step 306 in FIG. 19. At step 322, a first set of first and second random numbers (RN1 and RN2) are initially selected, such as from the random number generator (RNG) 188.

The first random number is used at step 324 as an input to the lookup table 194 to identify a selected dithering frequency, and the output dithering clock signal is set at a frequency in relation to the selected dithering frequency at step 326.

The second random number is used to initiate a timing interval using the timer circuit 190 at step 328. Decision step 330 determines whether the timing interval has been completed. It will be recalled that the first selected clock frequency continues to be applied during this timing interval. Stated another way, these actions provide the dithered clock signal with the first frequency segment having a clock frequency determined by the first random number and a duration determined by the second random number.

After the conclusion of the timing interval, a new set of first and second random numbers may be selected at step 332 and the foregoing steps are repeated to configure a second frequency segment in the dithered clock signal. While not shown in FIG. 18, as desired the maximum frequency may be selected as the frequency for the immediately following segment, using a new second random number to determine the overall duration thereof.

While various embodiments have been directed to a data storage device such as an SSD, such is merely exemplary and is not limiting. The various embodiments can be readily adapted to substantially any environment in which cryptographic processing is applied to reduce leakage of side-channel information in a communication channel of a data storage device.

As used herein, the term "random numbers" and the like will be understood consistent with the foregoing discussion to describe "true" random numbers, numbers that are essentially indistinguishable from true random numbers, and pseudo-random numbers.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method of reducing leakage of side-channel information in a communication channel, comprising:

generating a dithered clock signal comprising a succession of clock pulse segments, each clock pulse segment having alternating clock pulses at a different respective frequency selected in response to a first random number, each clock pulse segment further having a different overall duration selected in response to a second random number, the different respective frequency of each clock pulse segment generated by supplying the first random number to a lookup table as a data structure that stores a plurality of different frequency values in a memory, the overall duration of each clock pulse segment generated by supplying the second random number to a timer circuit; and using the dithered clock signal to clock a programmable processor having programming stored in a memory during execution of a cryptographic function involving multiple logical computations to arrive at an output value responsive to an input value over an overall time interval from receipt of the input value to generation of the output value.

2. The method of claim 1, wherein the lookup table comprises a plurality of entries individually indexable by the first random number, wherein a first number of the plurality of entries store a first frequency value corresponding to a first clock pulse segment in the dithered clock signal having the alternating clock pulses at a first frequency, and wherein a different, second number of the plurality of entries store a different, second frequency value corresponding to a different, second clock pulse segment in the dithered clock signal having the alternating clock pulses at a different second frequency.

3. The method of claim 2, wherein the first number is greater than the second number and the first frequency is higher than the second frequency.

4. The method of claim 1, wherein the generating step further comprises supplying a selected output frequency value from the lookup table as a clock frequency selection input to a clock circuit, and using the clock circuit to output the dithered clock signal responsive to the selected output frequency value from the lookup table.

5. The method of claim 4, wherein the clock circuit is characterized as a multiplexer circuit (mux) which receives each of a plurality of different input clock signals each having a different clock frequency.

6. The method of claim 5, wherein the multiplexer circuit is a glitchless mux.

7. The method of claim 5, wherein the multiplexer circuit is a synchronous mux.

8. The method of claim 4, wherein the clock circuit is characterized as a voltage controlled oscillator (VCO) which outputs the dithered clock signal responsive to a magnitude of an analog voltage generated responsive to the selected output frequency value.

9. The method of claim 1, wherein the generating step further comprises initializing the timer circuit using the second random number to count an elapsed time interval having a duration corresponding to the second random number, and switching in a new clock pulse segment in the dithered clock signal at a different frequency responsive to a conclusion of the elapsed time interval.

10. The method of claim 1, further comprising using the programmable processor to forward a dithering enable signal to commence generation of the dithered clock signal prior to execution of the cryptographic function.

11. The method of claim 1, further comprising subsequently utilizing the programmable processor to transfer data, via the communication channel, resulting from the execution of the cryptographic function while clocking the programmable processor using a steady state clock signal having a nominally constant frequency.

12. A data storage device comprising:

a main memory configured to store user data supplied by a host device;

a dithered clock circuit configured to generate a dithered clock signal comprising a succession of clock pulse segments, each clock pulse segment having alternating clock pulses at a different respective frequency selected in response to a first random number, each clock pulse segment further having a different overall duration selected in response to a second random number, the different respective frequency of each clock pulse segment generated by supplying the first random number to a lookup table as a data structure that stores a plurality of different frequency values in a memory, the overall duration of each clock pulse segment generated by supplying the second random number to a timer circuit; and a controller circuit comprising a programmable processor having associated programming in a memory configured to execute a cryptographic function involving multiple logical computations to arrive at an output value responsive to an input value over a time interval from receipt of the input value to generation of the output value, the programmable processor clocked during the execution of the cryptographic function using the dithered clock signal.

13. The data storage device of claim 12, wherein the input value comprises data associated with a host access command for transfer to or from the main memory.

14. The data storage device of claim 12, wherein the dithered clock circuit further comprises a random number generator circuit configured to output the respective first and second random numbers to the lookup table and timer circuit, respectively.

15. The data storage device of claim 12, wherein the lookup table comprises a plurality of entries individually indexable by the first random number, wherein a first number of the plurality of entries store a first frequency value corresponding to a first clock pulse segment in the dithered clock signal having the alternating clock pulses at a first frequency, wherein a different, second number of the plurality of entries store a different, second frequency value corresponding to a different, second clock pulse segment in the dithered clock signal having the alternating clock pulses at a different second frequency, and wherein the first number is greater than the second number and the first frequency is higher than the second frequency.

16. The data storage device of claim 15, wherein a different, third number of the plurality of entries in the lookup table store a different, third frequency value corresponding to a different, third clock pulse segment in the dithered clock signal having the alternating clock pulses at a different third frequency, and wherein the third number is less than the second number and the third frequency is lower than the second frequency.

17. The data storage device of claim 12, wherein the dithered clock circuit further comprises a multiplexer circuit (mux) which receives each of a plurality of different input clock signals each having a different clock frequency, the mux outputting a selected one of the plurality of different input clock signals as the dithered clock signal responsive to an input supplied by the lookup table.

18. The data storage device of claim 12, wherein the timer circuit is configured to be initialized by the second random number to count an elapsed time interval having a duration corresponding to the second random number, and wherein the dithered clock circuit switches in a new clock pulse segment in the dithered clock signal at a different frequency responsive to a conclusion of the elapsed time interval.

19. The data storage device of claim 12, wherein the succession of clock pulse segments of the dithered clock signal are formed from a plurality of frequencies comprising a maximum frequency and a plurality of sub-frequencies lower than the maximum frequency, and wherein the succession of clock pulse segments are ordered such that each clock pulse segment having a selected one of the plurality of sub-frequencies is immediately preceded by, and immediately followed by, a clock pulse segment at the maximum frequency.

20. The data storage device of claim 12, characterized as a solid state drive (SSD) with the main memory characterized as a NAND flash memory array.

* * * * *